United States Patent [19]

Skelly et al.

[11] 4,370,144

[45] Jan. 25, 1983

[54] TWO-PHASE ORGANIC SOLVENT-WATER DYEING PROCESS FOR POLYESTER FIBERS

[75] Inventors: James K. Skelly, Wilmslow; David G. Evans, Bamford, both of England; Carl Becker, Basel, Switzerland

[73] Assignee: Ciba-Geigy Corporation, Ardsley, N.Y.

[21] Appl. No.: 117,940

[22] Filed: Feb. 4, 1980

Related U.S. Application Data

[63] Continuation of Ser. No. 955,683, Oct. 30, 1978, abandoned.

[30] Foreign Application Priority Data

Nov. 10, 1977 [GB] United Kingdom ............... 46793/77

[51] Int. Cl.$^3$ ................................................. D06P 5/00
[52] U.S. Cl. .......................................... 8/501; 8/611; 8/613; 8/904; 8/922
[58] Field of Search ................... 8/501, 585, 589, 590, 8/586, 597, 576, 580, 904, 585, 611, 613

[56] References Cited

U.S. PATENT DOCUMENTS 2,089,212  8/1937  Kritchevsky ................... 260/124 R
3,977,828  8/1976  Becker et al. ........................... 8/585
4,030,882  6/1977  Blackwell ............................... 8/904
4,110,073  8/1978  Mollet et al. ........................... 8/904

FOREIGN PATENT DOCUMENTS 1418204  12/1975  United Kingdom .
1513160   6/1978  United Kingdom .

*Primary Examiner*—A. Lionel Clingman
*Attorney, Agent, or Firm*—Edward McC. Roberts

[57] ABSTRACT

A process of dyeing textile fibres in which the fibre is contacted with a two-phase suspension comprising an active solvent containing dissolved dye and the necessary amount of a bulking inert substantially immiscible solvent, the active solvent under the conditions of dyeing being liquid, is a solvent for the dye, is insoluble or only slightly soluble in the inert solvent, and in which the fixation affinity of the fibre for the dye is greater than that of the active solvent for the dye at the temperature required for the fixation, wherein the dye used is in the form of an aqueous, stable, highly concentrated, finely dispersed, flowable preparation insoluble to difficultly soluble in water containing at least 25% of finely dispersed dyestuff, at most 10% of an anion-active dispersing agent, at most 5% of a non-ionic dispersing agent and from 0 to 35% of a hydrotropic agent.

22 Claims, No Drawings

TWO-PHASE ORGANIC SOLVENT-WATER DYEING PROCESS FOR POLYESTER FIBERS

This is a continuation of application Ser. No. 955,683 filed on Oct. 30, 1978 now abandoned.

The present invention relates to a novel dyeing process more particularly to a dyeing process from a two-phase suspension.

In our British Patent Specification No. 1418204 there is described and claimed a process of dyeing textile fibres in which the fibre is contacted with a two-phase suspension comprising an active solvent containing dissolved dye and the necessary amount of a bulking inert substantially immiscible solvent, the active solvent under the conditions of dyeing being liquid, is a solvent for the dye, is insoluble or only slightly soluble in the inert solvent, and in which the fixation affinity of the fibre for the dye is greater than that of the active solvent for the dye at the temperature required for fixation.

In our copending British Patent Application No. 28907/77 there is described a modification of the process claimed in British Pat. No. 1418204 in which the active solvent is present during impregnation at a concentration greater than its solubility in the inert solvent at the fixation temperature and subsequently reduced to a concentration approximately at or not substantially less than its solublity in the inert solvent to achieve fixation.

While the process described in our above mentioned specification has proved satisfactory in most cases, we have found that when the process is conducted under conditions of high turbulence, for example, in a jet dyeing machine, the depth of shade obtained is not always as good as is expected. This is particularly true when a disperse dye is used. Such dyes normally contain a large amount of dispersing agent, often above 30% by weight, the powder forms containing more than the liquid forms.

We have shown that when such dyes are used under conditions of high turbulence, a stable emulsion of the active solvent is formed and, therefore, the required two phases are not present.

In our British Patent Specification No. 1 513 160 there are described and claimed, inter alia, aqueous, stable, highly concentrated, finely dispersed, flowable preparations of dyestuffs insoluble to difficulty soluble in water, which preparations have a low content of dispersing agent and a particle size smaller than 10µ, particularly smaller than 2µ, characterised in that the preparations contain at least 10 percent by weight of water, at least 30 percent by weight of a finely dispersed dyestuff insoluble to difficulty soluble in water, and a mixture consisting of at most 10 percent by weight of an anion-active dispersing agent, and at most 5 percent by weight of a non-ionic dispersing agent and at most 35 percent by weight of a hydrotropic agent, as well as, optionally, further additives.

In Swiss Patent Application 14346/77 there is described a similar aqueous dye preparation which contains no hydrotropic agent but contains a non-ionic dispersing agent which is a copolymer of ethylene oxide and a further olefin oxide, which copolymer has an ethylene oxide content of at least 65% by weight and a molecular weight of more than 12,000.

We have now found that because of the lower content and type of dispersing agent in these preparations both with and without a hydrotropic agent, they do not form a stable emulsion when used under conditions of high turbulence.

Accordingly, the present invention provides a process of dyeing textile fibres in which the fibre is contacted with a two-phase suspension comprising an active solvent containing dissolved dye and the necessary amount of a bulking inert substantially immiscible solvent, the active solvent under the conditions of dyeing being liquid, is a solvent for the dye, is insoluble or only slightly soluble in the inert solvent, and in wich the fixation affinity of the fibre for the dye is greater than that of the active solvent for the dye at the temperature required for fixation, wherein the dye used is an aqueous, stable, highly concentrated, finely dispersed, flowable preparation as described above.

These preparations are characterised in that they preferably contain not less than 10 percent by weight, especially 20 to 30 percent by weight, of water, at least 25 percent by weight, especially 35 to 65 percent by weight, preferably 40 to 60 percent by weight, of a finely dispersed dyestuff insoluble to difficultly soluble in water, and a mixture consisting of at most 10 percent by weight, especially 0.1 to 5 percent by weight, of an anion-active dispersing agent, from 0.5 to 5 percent by weight, especially 1 to 3 percent by weight, of a non-ionic dispersing agent and when a hydrotropic agent is present, this is preferably in a quantity at most 35 percent by weight, particularly 5 to 20 percent by weight, optionally together with further additives.

Suitable dyestuffs insoluble to difficultly soluble in water are, in particular, disperse dyestuffs. Mention may be made, for example, of the Celliton ® and Palanil ® dyestuffs of BASF, of the Cibacet ® and Terasil ® dyestuffs of Ciba-Geigy, of the Artisil ® and Foron ® dyestuffs of Sandoz, and of the Duranol ® dyestuffs of ICI, to mention just a few. Various chemical classes of dyestuffs are applicable, such as nitro dyestuffs, amino-ketone dyestuffs, ketoneimine dyestuffs, methine dyestuffs, nitrodiphenylamine dyestuffs, quinoline dyestuffs, aminonaphthoquinone dyestuffs, coumarin dyestuffs and, in particular, anthraquinone dyestuffs and azo dyestuffs, such as monoazo and disazo dyestuffs.

Such disperse dyestuffs are, for example, the monoazo dyestuffs of the formula

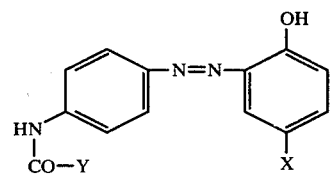

wherein X and Y each represent an alkyl radical having 1 to 4 carbon atoms,

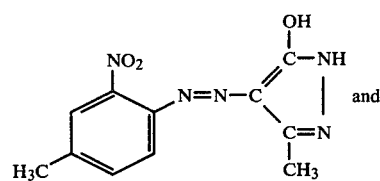

and

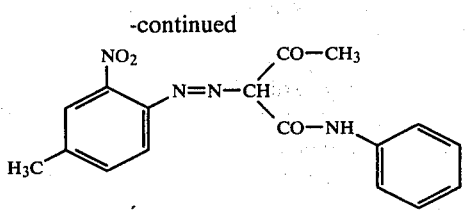

and, in particular, the quinophthalone dyestuff of the formula

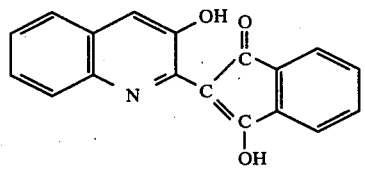

and the anthraquinone dyestuffs of the formulae

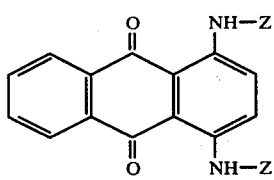

(Z=alkyl having 1 to 4 carbon atoms),

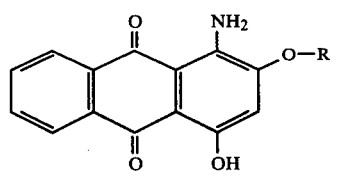

(R = alkyl or aryl)

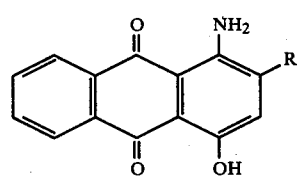

(R = Hal)

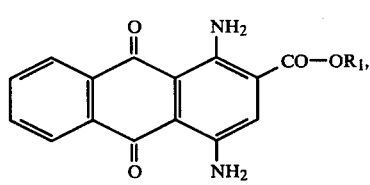

($R_1$=alkyl having 3 to 4 carbon atoms),

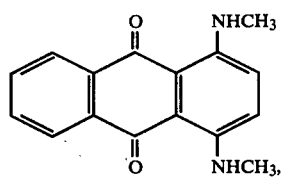

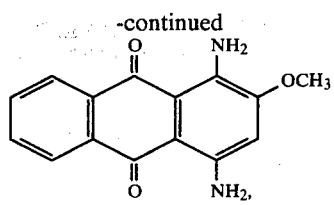

(A=alkyl or aryl), as well as brominated or chlorinated 1,5-diamino-4,8-dihydroxyanthraquinones.

Also suitable however are reactive disperse dyestuffs as the dyestuffs of the formulae

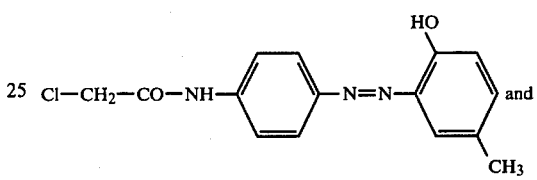

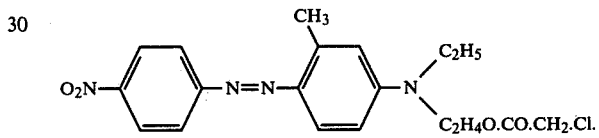

A further important factor is the choice of dyestuffs in the case of dyestuff combinations, for only those dyestuffs that are similar in their dyeing characteristics should be combined.

Suitable anion-active dipsersing agents are, e.g.: sulphated primary or secondary, purely aliphatic alcohols of which the alkyl chain contains 8 to 18 carbon atoms, e.g. sodium lauryl sulphate, potassium-α-methyl stearyl sulphate, sodium tridecyl sulphate, sodium oleyl sulphate, potassium stearyl sulphate, or the sodium salts of coconut oil alcohol sulphates; sulphated, unsaturated higher fatty acids or fatty acid esters, such as oleic acid, elaidic acid or ricinoleic acid, or lower alkyl esters thereof, e.g. ethyl ester, propyl ester or butyl ester, and the oils containing such fatty acids, such as olive oil, castor oil or rape oil; addition products of 1 to 20 moles of ethylene oxide with fatty amines, fatty acids or aliphatic alcohols having 8 to 20 carbon atoms in the alkyl chain, which addition products are converted into an acid ester by means of an organic dicarboxylic acid such as maleic acid, malonic acid or succinic acid, preferably however with an inorganic polybasic acid such as o-phosphoric acid or, in particular, sulphuric acid, for example such addition products with stearylamine, oleylamine, stearic acid, oleic acid, lauryl alcohol, myristyl alcohol, stearyl alcohol or oleyl alcohol, such as the ammonium salt of sulphated lauryl alcohol triglycol ether, or of 1 to 5 moles of ethylene oxide with alkylphenols, such as the acid sulphuric acid ester of the addition product of 2 moles of ethylene oxide with 1 mole of p-nonylphenol, the acid sulphuric acid ester of the addition product of 1.5 moles of ethylene oxide with 1 mole of p-tert.octylphenol, the acid sulphuric acid ester of the addition product of 5 moles of ethylene oxide with 1 mole of p-nonylphenol, the acid phosphoric acid ester of the addition product of 2 moles of ethylene oxide with 1 mole of p-nonylphenol, the acid maleic acid ester of the addition product of 2 moles of ethylene oxide with 1 mole of p-nonylphenol; sulphated esterified polyoxy compounds, for example sulphated, partially esterified polyvalent alcohols, such as the sodium salt of the sulphate monoglyceride of palmitic acid; instead of sulphates, it is also possible to use esters with other polyvalent mineral acids, e.g. phosphates; primary and secondary alkylsulphonates of which the alkyl chain contains 8 to 20 carbon atoms, e.g. ammonium decylsulphonate, sodium dodecylsulphonate, sodium hexadecanesulphonate and sodium stearylsulphonate; alkylarylsulphonates, such as alkylbenzenesulphonate having a straight-chain or branched-chain alkyl chain containing at least 7 carbon atoms, e.g. sodium dodecylbenzenesulphonate, 1,3,5,7-tetramethyloctylbenzenesulphonate, sodium octadecylbenzenesulphonate; such as alkylnaphthalenesulphonates, for example, sodium-1-isopropylnaphthalene-2-sulphonate; sodium dibutylnaphthalenesulphonate; or such as dinaphthylmethanesulphonates, for example the disodium salt of di-(6-sulphonaphthyl-2)-methane; sulphonates of polycarboxylic acid esters, for example sodium dioctyl sulphosuccinate, sodium dihexylsulphophthalate; the sodium, potassium, ammonium, N-alkyl-, N-hydroxyalkyl-, N-alkoxyalkyl- or N-cyclohexylammonium or hydrazinium and morpholinium salts of fatty acids having 10 to 20 carbon atoms, which are designated as soaps, such as lauric, palmitic, stearic acid, or oleic acid of naphthenic acids, of resinic acids, such as abietic acid, e.g. the so-called resin soap; esters of polyalcohols, particularly mono- or diglycerides of fatty acids having 12 to 18 carbon atoms, e.g. the monoglycerides of lauric, stearic, palmitic or oleic acid, as well as the fatty acid esters of sugar alcohols, such as sorbitol, sorbitans and saccharose, for example sorbitan monolaurate (Span 20), sorbitan palmitate (Span 40), sorbitan stearate (Span 60), sorbitan oleate (Span 80), sorbitan sesquiolate, sorbitan trioleate (Span 85), and the hydroxyethylation products thereof (Tween).

Anion-active dispersing agents which have proved particularly favourable are condensation products of aromatic sulphonic acids with formaldehyde, such as condensation products from formaldehyde and naphthalene sulphonic acids, or from formaldehyde, naphthalenesulphonic acid and benzenesulphonic acid, or a condensation product from crude cresol, formaldehyde and naphthalenesulphonic acid, and lignin sulphonates and polyphosphates. It is also possible to employ mixtures of anionic dispersing agents, such as, e.g., a mixture of the condensation product from crude cresol, formaldehyde and naphthalenesulphonic acid with lignin sulphonate.

Normally, the anionic dispersing agents are in the form of their alkali salts, their ammonium salts or their water-soluble amine salts. It is advantageous to use qualities having a low content of foreign electrolytes.

Nonionic dispersing agents are, for example: addition products of, e.g., 5 to 50 moles of alkylene oxides, especially ethylene oxide (with some ethylene oxide units being able to be replaced by substituted epoxides such as styrene oxide and/or propylene oxide), with higher fatty acids, or with saturated or unsaturated alcohols, mercaptans or amines having 8 to 20 carbon atoms, or with alkylphenols or alkylthiophenols of which the alkyl radicals contain at least 7 carbon atoms; reaction products from higher-molecular fatty acids and hydroxyalkylamines; these can be prepared, for example, from higher-molecular fatty acids, preferably such ones having about 8 to 20 carbon atoms, e.g. caprylic acid, stearic acid, oleic acid and, in particular, from the mixture of acids embraced by the collective term "coconut oil fatty acid", and from hydroxyalkylamines such as triethanolamine or preferably diethanolamine, as well as from mixtures of these amines, with the reaction being so performed that the molecular quantity ratio between hydroxyalkylamine and fatty acid is greater than 1, for example 2:1. Such compounds are described in the U.S. Pat. No. 2,089,212; condensation products of alkylene oxide, especially ethylene oxide, with some ethylene oxide units being able to be replaced by substituted epoxides, such as styrene oxide and/or propylene oxide.

Fatty alcohol polyglycol ethers have proved particularly advantageous, especially those having more than 20 moles of ethylene oxide, such as cetyl-stearyl alcohol etherified with 23 moles of ethylene oxide, stearyl-oleyl alcohol etherified with 80 moles of ethylene oxide and oleyl alcohol etherified with 20 to 80 moles of ethylene oxide. Furthermore, phenol ethers such as p-nonylphenol etherified with 9 moles of ethylene oxide, ricinoleic acid ester having 15 moles of ethylene oxide and hydroabietyl alcohol etherified with 25 moles of ethylene oxide are also very suitable.

These nonionic dispersing agents advantageously have a low electrolyte content. Mixtures of such agents are possible and in some cases have synergistic effects.

When the non-ionic dispersing agent is a copolymer of ethylene oxide and a further olefin oxide, which copolymer has an ethylene oxide content of at least 65% by weight and a molecular weight of more than 12,000, the olefin oxide may be, for example: 1,2- or 2,3-butylene oxide, styrene oxide, 2,3-epoxyhexane, 1,2-epoxyhexane, 1,2-epoxyoctane, butadiene monoxide or cyclohexene monoxide but especially propylene oxide.

Preferred copolymers are those of ethylene oxide and propylene oxide which have the formula:

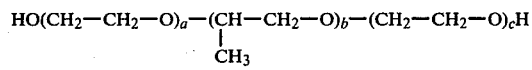

in which the sum of a and c is a number of at least 150 and preferably between 200 and 400 and b is a number between 20 and 100, preferably 30 to 80.

Amongst these copolymers, the following have proved particularly suitable for the process according to the invention:
(a) copolymers of the formula indicated above, in which the sum of a and c is a number from 200 to 225 and b is a number from 60 to 80,
(b) copolymers of the formula indicated above, in which the sum of a and c is a number from 280 to 320 and b is a number from 50 to 60, and
(c) copolymers of the formula indicated above, in which the sum of a and c is a number from 220 to 280 and b is a number from 40 to 55.

By hydrotropic agents used in the aqueous preparation are meant those agents capable of converting the dispersion of the dyestuffs insoluble to difficululy soluble in water into a stable deflocculated form, without in the process a chemical reaction occurring between the dyestuff and the hydrotropic substance. These compounds should be water-soluble. Suitable substances having these properties are, for example: hydrotropic salts such as the sodium salt of benzoic acid, the sodium salt of benzene-sulphonic acid, the sodium salt of p-toluenesulphonic acid or the sodium salt of N-benzylsulphanilic acid. Compounds which have proved particularly advantageous in this connection are, however, nitrogen-containing compounds, such as urea and derivatives thereof, for example dimethylurea or guanidine chloride, or acid amides such as acetamide and propionamide and derivatives thereof, especially N-methylacetamide.

With the application according to the invention of the dispersions of the dyestuffs as defined with or without a hydrotropic substance a stabilisation of the defloccu- lated dispersion is obtained without any actual dissolving of the dyestuffs occurring. If desired, the hydrotropic agent may be omitted from the dye preparation and added to the dyebath.

By virtue of this combination according to the invention, namely of the anion-active and nonionic dispersing agent with or without the hydrotropic agent it is possible to obtain aqueous preparations which have on the one hand a low content of dispersing agent and, on the other hand, a high content of dyestuff.

If desired or required, the preparations of the invention can contain further additives for improving properties, such as hygroscopic agents, e.g. glycols or sorbitols; antifrost agents, e.g. ethylene glycol or monopropylene glycol; antimicrobics; fungicides, e.g. aqueous formalin solution; antifoaming agents and aggents improving viscosity.

The production of the dyestuff preparations is described in U.S. Pat. No. 3,977,828.

As a result of the low amounts and types of dispersing agents present, a stable emulsion of the active solvent is not formed under conditions of high turbulence. This allows the two phases to be present and results in dyeings having a very full shade and a high exhaustion of dyestuff from the dyebath. This improvement is present, both when dyeing under conditions of high turbulence and under conditions of lower turbulence.

The dyeing may be carried out by the process which is described in our above-mentioned British Application No. 28907/77 in which the fiber is contacted with a two-phase suspension comprising an active solvent containing dissolved dye and the necessary amount of a bulking inert substantially immiscible solvent, the active solvent under the conditions of dyeing being liquid, is a solvent for the dye, is insoluble or only slightly soluble in the inert solvent, and in which the fixation affinity of the fiber for the dye is greater than that of the active solvent for the dye at the temperature required for fixation, and in which the active solvent is present during impregnation at a concentration greater than its solubility in the inert solvent at the fixation temperature and subsequently reduced to a concentration approximately at or not substantially less than its solubility in the inert solvent to achieve fixation.

In such a process the reduction in concentration of active solvent may be from 5 to 50% and preferably from 10 to 30%.

Examples of suitable active solvents for this process are phenoxyethanol, phenoxypropanol and benzyl alcohol; an example of an inert solvent is water.

For the sake of convenience and for economic reasons the concentration of active solvent during the impregnation is preferably not more than 20% by weight greater than its solubility in the inert solvent at the fixation temperature.

Preferably the concentration of active solvent during the fixation is the maximum amount or slightly below the maximum amount which will dissolve in the inert solvent at the fixation temperature.

After impregnation, the concentration of active solvent on the fibre may be reduced by physical or chemical methods. For example, further inert solvent may be added so that by normal equilibrium processes the active solvent is desorbed from the fibre into the inert solvent. Alternatively when dyeing is carried out in a circulating system which involves a dyeing chamber and a reserve tank, the inert solvent saturated with the active solvent may be cooled in the reserve tank causing the active solvent to come out of solution. The inert solvent is then recirculated into the dyeing chamber where in order to reach equilibrium in solution the active solvent is desorbed from the fibre.

Another method of reducing the concentration of the active solvent is to extract it from the inert solvent in the reserve tank with a solvent in which the active solvent is soluble and with which the inert solvent is immiscible. Examples of such solvents are perchloroethylene and xylene.

The inert solvent is then recirculated into the dyeing chamber where in order to reach equilibrium in solution, the active solvent is desorbed from the fibre.

The process of this invention enables a more rapid and uniform impregnation to be achieved, if desired at an initial higher temperature, for example from 60° to 100° C. and also a full fixation.

The following Examples further illustrate the present invention.

EXAMPLES 1-11

Various disperse dye preparations, as listed below, were used to dye polyester fibre in a laboratory dyeing machine which does not produce high turbulence for 15 minutes at 100° C., using a liquor ratio of 15:1 and 40 g/l of 2-phenoxyethanol. Dyeings on polyester were also carried out in an open beaker using high speed stirring (3000 rpm) at a liquor ratio of 25:1, for 15 minutes at 100° C. For comparison, a normal powder quality of each dyestuff was also used. In the Table below, the percentage exhaustion of the dyestuffs are given, and show the higher exhaustion rates, and consequently fuller shades, obtained when the liquid dye preparations are used.

The dyestuffs were made up according to the following formulation, and had a viscosity of 300-800 cp (Brookfield).

30-42%: Dyestuff
1-2%: Sodium salt of condensed naphthalene sulfonic acid
1-3%: Non-ionic dispersant
20%: Hydrotropic Agents
remainder water, glycols, biocides and thickening agents.

The dyestuffs used in these formulations were:

| Example | Dyestuff |
| --- | --- |
| 1 | 35% C.I. Disperse Orange 53 |
| 2 | 30% C.I. Disperse Yellow 82 |
| 3 and 9 | 39% C.I. Disperse Red 169 |
| 4 | 42% C.I. Disperse Yellow 85 |
| 5 and 10 | 41% C.I. Disperse Yellow 42 |
| 6 and 11 | 42% C.I. Disperse Orange 80 |

| Example | Dyestuff |
| --- | --- |
| 7 | 42% C.I. Disperse Violet 57 |
| 8 | 30% C.I. Disperse Blue 87 |

In the Table below A refers to a normal commercial powder form of the dyestuff and B refers to the liquid preparations of the invention. The dyeings were produced at depths of shade equivalent to 2% (on weight of fibre) of the normal commercial powder form.

| Example | % Exhaustion | | | |
| --- | --- | --- | --- | --- |
| | L | | T | |
| | A | B | A | B |
| 1 | 93.7 | 96.1 | 89.5 | 92.2 |
| 2 | 94.9 | 98.4 | 91.8 | 98.2 |
| 3 | 93.0 | 97.6 | 95.7 | 98.2 |
| 4 | 95.8 | 96.7 | 96.5 | 97.6 |
| 5 | 92.7 | 96.0 | 90.2 | 95.6 |
| 6 | 86.2 | 94.6 | 92.7 | 97.1 |
| 7 | 91.4 | 98.5 | 92.0 | 98.9 |
| 8 | 96.4 | 98.5 | 89.1 | 98.3 |

L = Dyeing produced in laboratory dyeing machine not producing high turbulence.
T = Beaker dyeing with high turbulence.

The effect is more pronounced when preparing dyeings in full shades, i.e. at a depth of 6% (on weight of fibre) of the normal commercial powder form of the dye.

| Example | % Exhaustion T | |
| --- | --- | --- |
| | A | B |
| 9 | 75.0 | 94.3 |
| 10 | 77.6 | 88.9 |
| 11 | 78.1 | 91.6 |

The higher quantity of normal commercial powder disperse dye to produce full shades also means that a high quantity of dispersing agent was present, thus producing a more stable emulsion and reducing the amount of dye exhausted on to the fibre.

PRODUCTION OF THE PREPARATION

EXAMPLE 12

500 parts of the coarse crystalline dry dyestuff of the formula

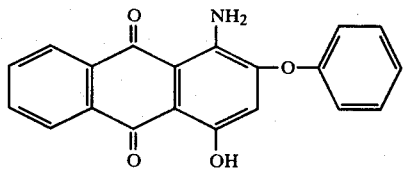

are slowly introduced, with intensive stirring, into a preprepared solution of 25 parts of an anion-active dispersing agent (sodium salt of naphthalene sulphonic acid condensed with formaldehyde), 10 parts of a fatty alcohol polyglycol ether as nonionic dispersing agent (cetyl/stearyl alcohol etherified with 25 moles of ethylene oxide), 10 parts of a 35% aqueous formalin solution, 100 parts of 1,2-propylene glycol as antifrost agent and 118 parts of urea, as hydrotropic stabilising agent, and the whole is then homogenised for about 1 hour and deaerated.

This 55% dyestuff mixture is then ground in a sand mill, or preferably in a closed ball mill (bead mill), by means of Ottawa sand and Siliquarzit balls (1 mm diameter), respectively, for about 10 hours at a temperature of 20° to 50° C. After this time there is obtained a dispersion of which the vast majority of particles are smaller than 5μ. The finely ground dispersion is subsequently diluted to give a dyestuff content of 50% (yield: 1000 parts) by the addition of a further 90 parts of water, which if necessary contains an amount (to be determined beforehand) a carboxymethylcellulose as thickening agent, in order to bring the final viscosity into the ideal range of 500 to 1000 cP (Brookfield viscosimeter; 30 r.p.m.).

When this dyestuff preparation is used in the abovedescribed dyeing process according to the invention, similarly good results are obtained.

EXAMPLE 13

367 parts of the disperse dye of the formula

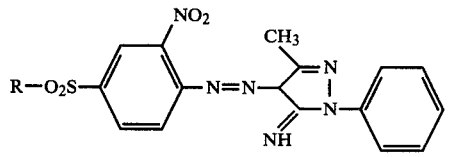

R = 50% $CH_3$, 50% $C_2H_5$ in the form of the crude dye which has been substantially freed from electrolytes and dried, 20 parts of a sulphonated fractionated kraft-lignin which has a carbon: organically bonded sulphur ratio of 33:1 and consists to the extent of 80% of molecules having a molecular weight between 6,000 and 50,000 (Reax 85 A) and 31 parts of a non-ionic polycondensation product consisting of 20% of polypropylene oxide and 80% of polyethylene oxide and having a molecular weight of about 16,500 (Pluronic ® F 108) are stirred in a dispersing medium consisting of 398 parts of water, 204 parts of 1,2-propylene glycol, 6 parts of a 37% solution of formaldehyde, 2 parts of chloracetamide and 2 parts of the silicon antifoam agent Fumexol SD ®.

The dispersion is ground in a stirred mill by means of zirconium oxide grinding media until the primary particle size of the dye is less than 5μ in the case of the vast majority of the particles. The ground material is separated from the grinding media and is deaerated. To increase the viscosity to a value between 500 and 1,000 cP, 0.1–0.2% by weight of xanthan gum (Rhodopol 23, Rhône-Poulenc) is added and stirring is continued for several hours. The dye preparation obtained affords similar good results in the above-described dyeing process according to the invention.

EXAMPLES 14–24

Various disperse dye preparations, as listed below, were used to dye polyester fibre as described above. Similarly good results were obtained.

The dyestuffs were made up according to Example 13, having the following formulation.

25–60% Dyestuff
0.1–5% Anionic dispersant, especially sodium lignosulfonate
0.5–5% Non-ionic copolymer of ethylene oxide and a further olefin oxide, which copolymer has an ethylene oxide content of at least 65% by weight and a molecular weight of more than 12,000
remainder water, glycols, biocides and optionally thickening agent.

The following dyestuffs were employed:

| Example | |
|---|---|
| 14 | CH₃O–⟨⟩(NO₂)–N=N–CH(CO–N(CH₃)–CO–N(C₆H₄Cl)–CO) |
| 15 | ⟨⟩–NH–⟨⟩(O₂N)–SO₂–HN–⟨⟩ |
| 16 | (C₂H₅)₂N–⟨⟩–O–C(=N-C₆H₄CH₃)... (coumarin-type structure) |
| 17 | anthraquinone with NH₂, NH₂, and N–CH₂–CH₂–CH₂–O–CH₃ substituents; R = NH major portion, R = O small amount |
| 18 | 1-hydroxy-4-(4-methylsulfonyloxy-anilino)anthraquinone: O,OH / NH–⟨⟩–O–SO₂CH₃ |
| 19 | O₂N–⟨⟩(Cl)–N=N–⟨⟩–N(C₂H₄OC₂H₄CN)(C₂H₄CN) |
| 20 | O₂N–⟨⟩–N=N–⟨⟩–N(C₂H₄OC₂H₄CN)(C₂H₄CN) |
| 21 | O₂N–⟨⟩(R, NO₂)–N=N–⟨⟩(OCH₃, NHCO–CH₃)–N(CH₂–⟨⟩)(CH₂Cl₂OCOCH₃); R = Cl major portion, R = H smaller amount |
| 22 | O₂N–⟨⟩(NO₂, Cl)–N=N–⟨⟩(OCH₃, NHCO–CH₃)–N(R)(CH₂CH₂OCH₂CH₂CN); R = H ca. 60%, R = CH₂CH₂OCH₂CH₂CN |
| 23 | 1-amino-4-hydroxy-2-(phenoxycarbonylmethoxyethoxy)anthraquinone: OCH₂CH₂OCOO–⟨⟩ |
| 24 | ⟨⟩–N=N–⟨⟩–N=N–naphthalene(OH, SO₂N(H)CH₂CH₂OCOCH₃) |

What is claimed is:

1. A process for dyeing polyester fibers comprising the steps of contacting the fibers with a two-phase system comprising (A) an organic solvent chosen from the group consisting of phenoxyethanol, phenxypropanol and benzyl alcohol and (B) water, in a weight ratio of about 1:25, said organic solvent containing a disperse dye dissolved therein, which dye is introduced into the two-phase system in the form of an aqueous, stable, highly concentrated, finely dispersed, flowable preparation having a low content of dispersing agent and a particle size of the dyestuff particles smaller than 10 microns, said preparation containing at least 10% by weight of water, at least 25% by weight of dyestuff, at most 10% by weight of an anionic dispersing agent, at most 5% by weight of a non-ionic dispersing agent and at most 35% by weight of a hydrotropic agent, at a temperature of about 100° C. and subsequently removing the organic phase from the system to fix the dye, the entire process being carried out at a temperature of about 100° C.

2. A process of claim 1, wherein the dyestuff particle size is smaller than $2\mu$.

3. A process of claim 1, wherein the dye preparation contains form 20 to 30% by weight of water.

4. A process of claim 1, wherein the dye preparation contains from 35 to 65% by weight of dyestuff.

5. A process of claim 1, wherein the dye preparation contains from 40 to 60% by weight of dyestuff.

6. A process of claim 1, wherein the dye preparation contains from 0.1 to 5% by weight of an anionic dispersing agent.

7. A process of claim 1, wherein the dye preparation contains from 0.5 to 5% by weight of a non-ionic dispersing agents.

8. A process of claim 1, wherein the dye preparation contains from 1 to 3% by weight of a non-ionic dispersing agent.

9. A process of claim 1, wherein the dye preparation contains from 5 to 20% by weight of a hydrotropic agent.

10. A process of claim 1, wherein the anionic dispersing agent is the condensation product of an aromatic sulphonic acid with formaldehyde.

11. A process of claim 1, wherein the anionic dispersing agent is the condensation product of formaldehyde and naphthalene sulphonic acid.

12. A process of claim 1, wherein the anionic dispersing agent is the condensation product of formaldehyde, naphthalene sulphonic acid and benzene sulphonic acid.

13. A process of claim 1, wherein the anionic dispersing agent is the condensation product of crude cresol, formaldehyde and naphthalene-sulphonic acid.

14. A process of claim 1, wherein the anionic dispersing agent is the condensation product of crude cresol, formaldehyde and naphthalene sulphonic acid with lignin sulphonate.

15. A process of claim 1, wherein the nonionic dispersing agent is an addition product of 5 to 50 moles of alkylene oxide with a higher fatty acid, or with a saturated or unsaturated alcohol, mercaptan or amine having 8 to 20 carbon atoms or with an alkyl phenol or alkylthiophenol of which the alkyl radical contains at least 7 carbon atoms.

16. A process of claim 1, wherein the nonionic dispersing agent is a reaction product of a higher-molecular fatty acid and a hydroxyalkylamine, at a molecular ratio of hydroxyalkyl amine to fatty acid is greater than 1.

17. A process of claim 1, wherein the nonionic dispersing agent is a reaction product of coconut oil fatty acid and diethanolamine.

18. A process of claim 1, wherein the nonionic dispersing agent is a condensation product of alkylene oxide.

19. A process of claim 1, wherein the nonionic dispersing agent is a copolymer of ethylene oxide and propylene oxide having the formula

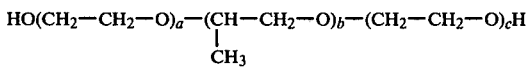

in which the sum of a and c is at least 150 and b is number between 20 and 100.

20. A process of claim 1, wherein the hydrotropic agent is urea or dimethylurea.

21. A process of claim 1, wherein the hydrotropic agent is N-methylacetamide.

22. The textile fibres dyed by the process as claimed in claim 1.

* * * * *